United States Patent [19]

Parkinson et al.

[11] Patent Number: 4,584,781
[45] Date of Patent: Apr. 29, 1986

[54] LOW FRICTION VACUUM VALVE AND DRYING APPARATUS

[75] Inventors: Martin C. Parkinson, 6 N. Delaware Dr., Nyack, N.Y. 10960; Gary B. Wiley, Sinking Spring, Pa.

[73] Assignee: Martin Parkinson, Nyack, N.Y.

[21] Appl. No.: 728,525

[22] Filed: Apr. 29, 1985

[51] Int. Cl.$^4$ .................. F26B 13/30; F26B 21/06; E03B 3/00
[52] U.S. Cl. .................................. 34/92; 137/625.23; 137/625.24; 137/625.47
[58] Field of Search .............. 34/92, 80; 137/625.47, 137/625.23, 625.24; 251/310; 422/103

[56] References Cited

U.S. PATENT DOCUMENTS

| 2,547,929 | 4/1951 | Dawson | 137/625.23 |
| 2,854,027 | 9/1958 | Kaiser et al. | 137/625.47 |
| 3,516,170 | 6/1970 | Liobis et al. | 34/92 |
| 4,308,892 | 1/1982 | Ausdal | 34/625.24 |

*Primary Examiner*—John J. Camby
*Attorney, Agent, or Firm*—Martin Parkinson

[57] ABSTRACT

A vacuum valve maintaining the simplicity of operation and reliability of a glass stopcock for large bore, low impedance vacuum procedures, such as continuous freeze drying. A rigid inner member, with friction reducing raised circumferential and longitudinal portions, is rotated within a clear elastomeric outer member to provide various vacuum connections.

11 Claims, 8 Drawing Figures

LOW FRICTION VACUUM VALVE AND DRYING APPARATUS

BACKGROUND OF THE INVENTION

The present invention relates to vacuum valves, and more particularly to valves for use in a continuous vacuum drying apparatus, such as a continuous freeze dryer.

In this equipment, valves with small bores are inadequate to deal with the large volumes of gases involved. Vacuum valves must present low impedance to the vacuum pump for maximum air removal capacity, and also low impedance for water vapor flow coming from the drying chamber. Therefore, valves with a minimum internal diameter of one half inch are needed for efficient fluid flow, and then on upwards to three inches I.D. and larger. The valves must operate on a continuous basis, and do it reliably over a period of years.

The problem that is addressed here is best exemplified by continuous vacuum applications, as for example, an apparatus for continuous freeze drying. In a standard, non-continuous freeze dry apparatus aqueous samples to be dried are first frozen and then are subjected to a high vacuum and controlled heat input. Under these conditions the water content of the sample sublimes off, ultimately leaving a dry, porous product which is substantially unaltered by the drying process. The freeze dry method is used extensively for the high quality preservation of pharmaceuticals such as vaccines, antibiotics, vitamin preparations, etc.

The freeze dry apparatus basically consists of three components. First, a vacuum chamber to contaim the product to be dried; second, a water vapor trap to sequester the sublimating water vapor; and third, a vacuum pump to provide the required high vacuum for sublimation to efficiently occur.

For the process to be continuous at least a fourth component, i.e. a second water vapor trap, must be added. During the drying process, if means are provided for continually adding product to the drying chamber, the first trap will eventually exhaust its water holding capacity. At this point it must be temporarily be disconnected from the system, and the second trap connected in its place while the first trap is being defrosted or otherwise regenerated for subsequent reconnection to the system at the point that the second trap is exhausting its water holding capacity.

Except for small scale research equipment the fluid conduits used in freeze drying have necessarily large internal diameters of the order of 1 inch, 2 inches, 3 inches or even larger. This is to provide low impedance removal of air from the sytem by means of the vacuum pump, and efficient flow of water vapor from the product chamber to the vapor trap. Therefore, vacuum valves that are needed for a continuous process must have large bores and offer low flow resistance. A variety of such valves are commercially available, ofter referred to as "gate", "flap", or "disk" valves. Solenoid operated disk valves are often a preferred valve for high vacuum systems. They can be maintained in a fully open or fully closed position until energized, depending on the application.

Although valves of the above mentioned types can be employed successfully in a continuous vacuum system, they are expensive to manufacture. Since a number of these valves would be required to permit continuous operation they add significantly to the cost of the complete equipment.

Servicing these valves is difficult. Gross defects within the valve cannot be seen from the outside of the valve since they are normally fabricated in opaque materials, such as metal. Subtle defects within the valve also require removal of the valve in order to take it completely apart to carefully examine all of the components.

Another disadvantage of these valves, when they must have large internal diameters, is their large bulk. Connecting a number of them within the confines of a cabinet often presents difficult problems of spatial arrangement of the components of the cabinet.

Accordingly, it is an object of the invention to provide an inexpensive vacuum valve.

Another object is to provide an inexpensive vacuum valve for continuous vacuum procedures.

Another object is to provide a vacuum valve that is easy to service.

Another object is to provide a vacuum valve that is extremely relaible in operation.

A further object is to provide a vacuum valve that is compact and easy to install in confined spaces.

SUMMARY OF THE INVENTION

The above and related objects are accomplished by employing an elastomeric outer member with a rigid, tubular member slidably and rotatably mounted within.

Stopcocks have been used for many years to control fluid flow in small scale vacuum systems. They can be fabricated in many ways, but usually they are made of Pyrex glass as to both the outer tubular member and the rotatable inner rod or stopper. Silicone grease is often employed between the two members. Stopcocks have many desirable features. Since they are made of Pyrex glass gross defects are quickly observed. Visually undetectable defects can often be found when they are being used in a vacuum system by simply exposing the outer surfaces of the stopcock to the spark from a Tesla coil (high intensity spark induction coil). A vacuum leak shows up as a change in color of the spark. They are compact in shape, relatively inexpensive, and tend to perform with great reliability for prolonged periods of time. However the rapid increase in frictional forces between the outer tubular member and the internal rod or stopper when bore sizes much larger than 10 millimeters I.D. are attempted, has prevented their use as large bore, low impedance vacuum valves.

We find that we can maintain the advantages of the stopcock principle for a large bore, low impedance vacuum application by employing an elastomeric, tubular outer member and a rigid, tubular inner member with a greatly reduced surface area in contact with the outer member.

For example, in a continuous freeze dryer, in one preferred embodiment, a rigid, tubular inner member and a tubular, elastomeric outer member connect both water vapor condensers to the drying chamber and vacuum pump by means of suitable openings in both members. Circumferentially and longitudinally raised portions at spaced distances along the periphery of the inner member are the only surfaces of this member in contact with the inner surface of the elastomeric outer member. This reduction in frictional force permits turning the rigid, inner member easily throughout a 180° angle even in a diameter in excess of three inches and in a length in excess of two feet. At the same time, the raised portions prevent the leakage of atmospheric air into the system when a timed turning sequence disconnects the first water vapor condenser from the vacuum system when it is presumably loaded with water, and connects the second water vapor condenser which is in a regenerated state and ready for operation.

In a second preferred embodiment of the vacuum valve for use in a continuous freeze dry system, the same reduction in frictional force as described above is obtained by reducing the diameter of the rigid, inner member along the greater portion of its length. The full diameter is permitted to contact only the inner surface of the elastomeric outer member at spaced distances along the length of the inner member, both circumferentially along its length and longitudinally, so that when appropriate slots in the inner member are in registration with openings in the outer member, leakage of atmospheric air into the system is prevented as the valve performs its function of connecting a first vapor trap to the system, and then disconnecting that trap, and connecting the second one, etc., as the drying process goes on.

The vacuum valve is compact and relatively inexpensive to fabricate when compared to large bore high vacuum valves of conventianal design. When the elastomeric outer member is fabricated in a clear elastomer, such as clear urethane, it is also easy to inspect for large scale defects, and may be checked with a Tesla coil for non-visable defects such as a small vacuum leak. The vacuum valve is also extremely reliable in long tern, continuous vacuum procedures, such as continuous freeze drying.

BRIEF DESCRIPTION OF THE DRAWINGS

FIG. 1A is a partial sectional, partial cutaway view of the valve taken along line 1A—1A of FIG. 1 showing the inner and outer member in registration for atmospheric venting of the first condenser and vacuum connection of the second condenser.

DETAILED DESCRIPTION OF THE PREFERRED EMBODIMENT

Figure 1:
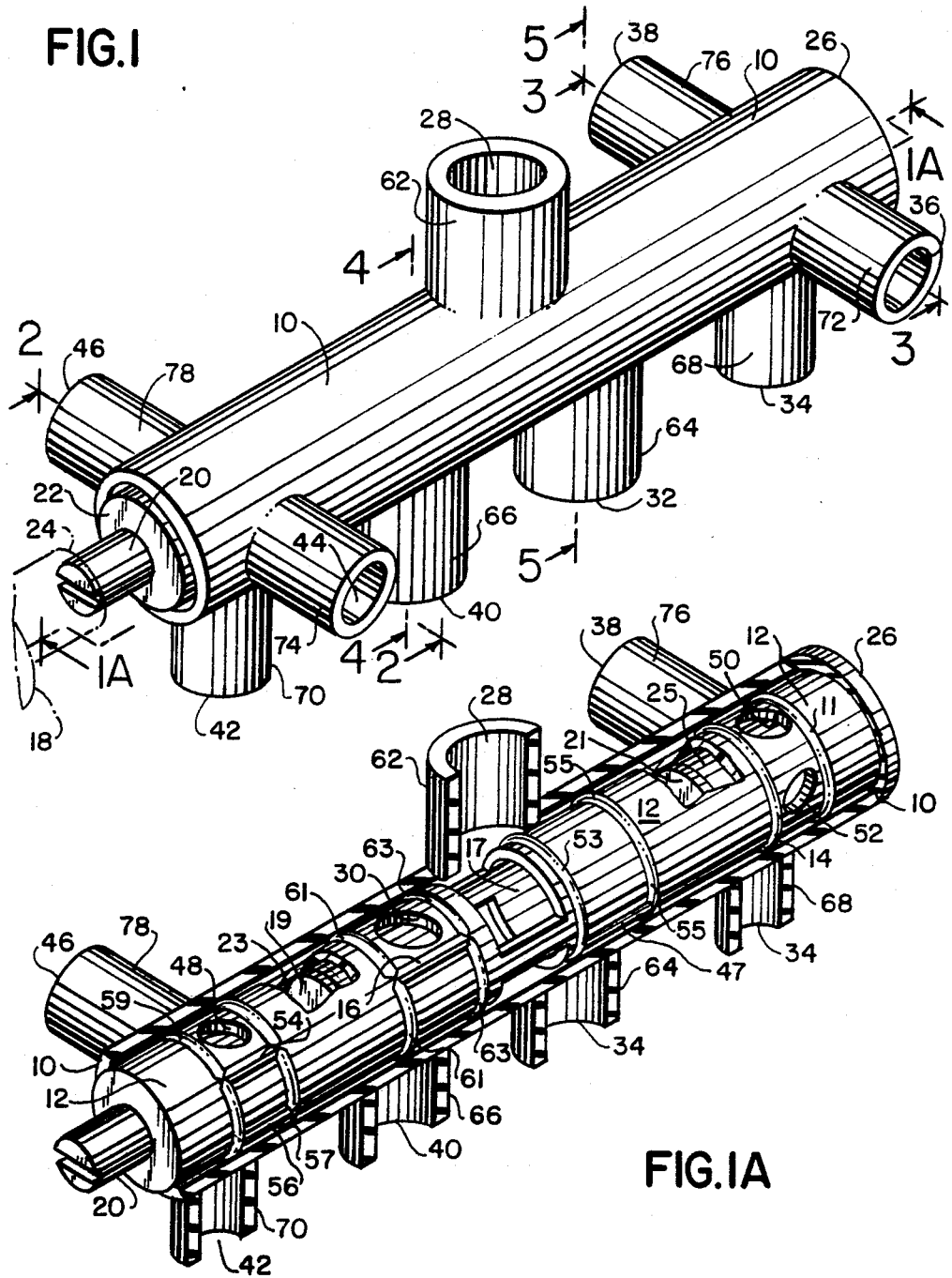
FIG. 1 is a perspective view of one preferred embodiment of the invention showing the rigid, tubular inner member of the valve inserted within the elastomeric outer member, the connection of the inner member to a motor illustrated in phantom, for operational use in accordance with the present invention.
Figure 2:
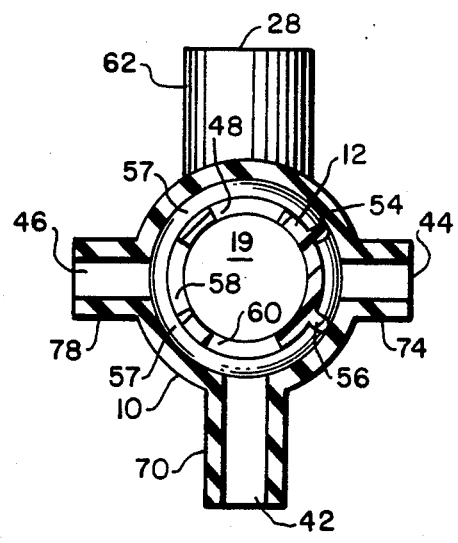
FIG. 2 is a sectional view of a portion of the valve taken along line 2—2 of FIG. 1 showing the inner and outer members openings in registration for atmospheric venting of the first condenser.
Figure 3:
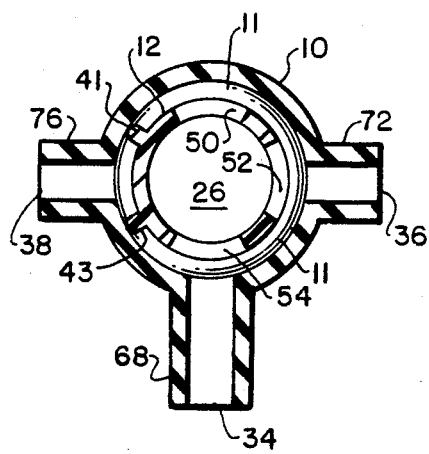
FIG. 3 is a sectional view of a portion of the valve taken along line 3—3 of FIG. 1 showing the inner and outer members openings in registration for vacuum connection of the second condenser.
Figure 4:
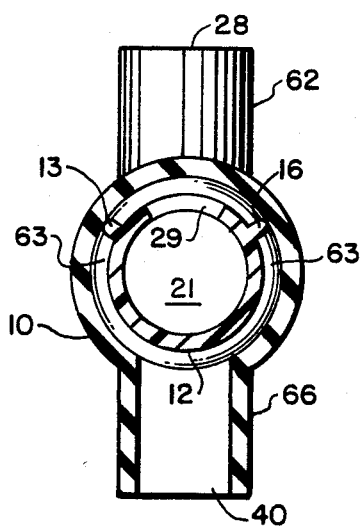
FIG. 4 is a sectional view of the valve taken along the line 4—4 in FIG. 1 showing the openings in the inner and outer members out of registration for connection of the first condenser.
Figure 5:
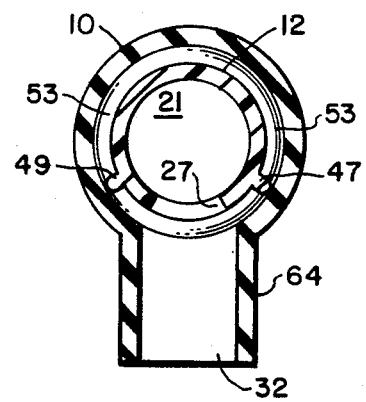
FIG. 5 is a sectional view of the valve taken along the line 5—5 in FIG. 1 showing the openings in the inner and outer members in registration for connection of the second condenser.

Referring now to FIGS. 1, 2, 3, 4, 5, and 7 of the drawings, there is shown a motor 18 operated vacuum valve consisting of a rigid inner member 12, and an elastomeric outer member 10. Outer member 10 is preferrably fabricated in a clear elastomer, such as clear urethane, in order to be able to have a clear view of any large scale malfunctions of the valve, and also to be able to use a Tesla coil (high voltage spark induction coil) so as to observe possible vacuum leaks in the valve when it is in high vacuum operation.

The rigid, inner member 12 may be fabricated of many suitable materials, such as high density polyvinyl chloride pipe and tubing. A bore 17 within member 12 runs between left hand fluid barrier 19 and right hand fluid barrier 21. Inner member 12 is sealed at one end by end plate 22 and at its other end by end plate 26. Bore 23 runs between end plate 22 and fluid barrier 19. Similarly, bore 25 runs between end plate 26 and fluid barrier 21.

Along the perphery of inner member 12 there are four pairs of circumferentially raised portions located at spaced distances from each other, such as circumferential portions 57, 59, and 14. Four pairs of longitudinally raised portions are located on the periphery of member 12, connected between each of the pairs of circumferentially raised portions. The function of these raised areas is to provide a vacuum tight engagement with member 10 while at the same time permitting member 12 to rotate easily through programmed, pre-selected angles of rotation.

Inner member 12 has eight circular openings for timed engagement of eight mating openings in outer member 10, such as openings 48 and 50, as well as a centrally located slot 15 for continuous engagement of opening 28 of conduit 62 in outer member 10.

Outer member 10 is stationary during valving operations. To cooperate with the openings in inner member 12 it has four perpendicular conduits 70, 66, 64, and 68 extending downward; near one end conduits 78 and 74 extend at right angles from the main body of the outer member; near its other end conduits 72 and 76 extend at right angles from the main body; and near its center conduit 62 extends upward from the outer member.

To form an operable valve, inner member 12 whose circumferentially and longitudinally raised portions combine to give it a slightly larger outer diameter than the inner dimeter of central conduit 31, is placed within outer member 10. To facilitate this placement and to aid in maintaining a high vacuum seal in operation, a lubricant, such as high vacuum silicone grease, is used to lubricate both the outer surface of the inner member 12, and also the inner surface of conduit 31 in outer member 10.

Figure 7:
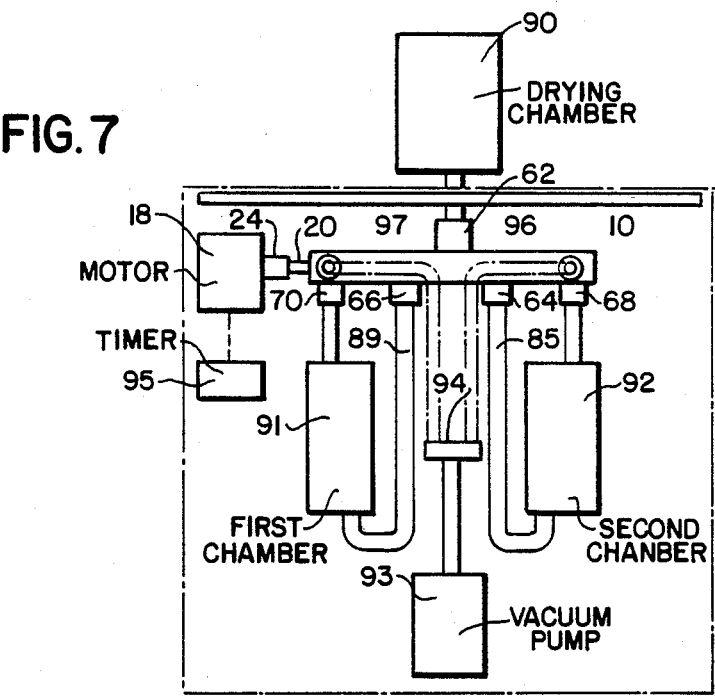
FIG. 7 is a schematic view of one possible continuous freezedry apparatus, with the valve of the invention shown in operative use therein.

Referring now to FIG. 7, the valve of the invention is depicted in operative use with a schematically illustrated continuous freeze drying apparatus. Operation of the continuous freeze dryer is begun by energizing the vacuum pump 93, the timer 95, and the motor 18. The timer is the automatic control of the freeze dryer for turning the motor on and off. The function of the motor is to rotate the inner member 12 of the valve through a preselected angle of rotation at pre-selected periods of time. A variety of motors can be used for this application. For example, a motor commonly referred to as a rotating electric valve actuator may be employed. In the example being described, a motor of this type yielding 150 inch pounds of torque, is adequate to provide the rotational movement of the valve inner member. The motor is connected to the inner member by engaging end coupling 20 affixed to end plate 22 to motor coupling 24.

When the continuous freeze dryer is first energized the inner member is rotated through a 180° angle of rotation, stopping for a pre-selected period of time when it is in a position such as depicted in FIG. 1A. The original air and other gases, principally within the drying chamber 90 and second condenser 92, are now quickly removed by the vacuum pump. For example, in the case of the drying chamber, which is in vacuum tight engagement with conduit 62, under the influence of vacuum pump 93 gases flow out of the chamber through opening 28 in conduit 62, then flow through slotted opening 15 into bore 17, then through opening 27 (FIG. 5) in inner member 12 which is in registration with opening 32 in conduit 64, through vacuum connection 85 to the base of second condenser 92 which is in vacuum tight engagement with vacuum connection 85, on up through the top of second condenser 92 which is in vacuum tight engagement with conduit 68 and opening 34 therein, on through opening 52 in inner member 12 which is in registration with opening 36 of conduit 72, then on through vacuum connection 96 which is in vacuum tight engagement with conduit 72 and "T" connection 94, and then through vacuum connection 98 which is in vacuum tight engagement with "T" connection 94 and vacuum pump 93, and finally into the vacuum pump 93, whereupon the gases are expelled to the atmosphere.

At this time first condenser 91 is at atmospheric pressure since it is vented to atmosphere by opening 46 in conduit 78, which is in registration with opening 58 (FIG. 2) in the inner member, and opening 60 is simultaneously in registration with opening 42 in conduit 70. During this time, while at atmospheric pressure, the first condenser is being defrosted or otherwise regenerated so that it will be in a condition to replace the function of the second condenser when that condenser is approaching its water holding capacity. Three hours is a suitable time period for regenerating the first condenser. Atmospheric air is prevented from gaining entrance to the main body of the valve at this time, and hence to the entire system, by circumferentially raised portions 57 and 59, and longitudinally raised portions 54 and 56, which are in vacuum tight emgagement with outer member 10. In the same manner circumferentially raised portions 61 and 63, and longitudinally raised portions 13 and 16 (FIG. 4) prevent atmospheric air from gaining access to the system through conduit 66. Similarly atmospheric air is kept out of the system by circumferential portions 11 and 14, and longitudinal portions 41 and 43, which form a vacuum tight seal with the outer member, while openings 34 and 52 in the inner member are connected to the vacuum system.

While the aforementioned circumferential and longitudinal portions perform the vital function of maintaining the vacuum seal of the valve in operation, they also have a second, equally important function. The raised portions greatly reduce the surface area of the inner member that actually contacts the internal surface of the outer member. When properly lubricated, this permits easy turning of the inner member through a 180° angle of rotation repeatedly over prolonged periods of time, even with a three inch outer diameter by a two foot length of inner member operating within a two foot length of the outer member.

In a freeze drying procedure, after the vacuum pump has removed most of the air and other residual gases from the drying chamber and condenser, sublimation of frozen aqueous product (not shown) within the drying chamber can proceed. The sublimating water vapor takes the same path as the original air content, but when it reaches the interior of the second condenser it is frozen out in the form of ice on refrigerated coils, or is otherwise sequestered within the second condenser. Non-condensable gases, such as air and carbon dioxide, continue to be expelled directly to the atmosphere by means of the vacuum pump.

After a period of time, e.g. three hours, it is considered that the second condenser is approaching its maximum water holding capacity. At this time the timer 95 turns on the motor 18 which in turn rotates the inner member 180° in either a clockwise or counterclockwise direction within outer member 10. The motor is then turned off, and this sequence of operation will be repeated every three hours.

In this second valve position gases such as air and water vapor flow out of drying chamber 90, through opening 28 in conduit 62, through slot 15 and bore 17 into opening 29 in the inner member which is now in registration with opening 40 in conduit 66, and then through vacuum connection 89 which is in vacuum tight engagement with the base of the first condenser. At this point air and other non-condensable gases will continue to move upwards and out of the first condenser, but the water vapor will be sequestered within the first condenser. The non-condensable gases move out of the top of the first condenser through opening 42 in conduit 70 which is in vacuum tight engagement with the first condenser, then on through opening 48 in the inner member which is now in registration with opening 42 of conduit 70, and then through opening 58 in the inner member which is now in registration with opening 44 of conduit 74. The non-condensables then flow through vacuum connection 97 which is in vacuum tight engagement with conduit 74 and "T" connection 94, then through vacuum connection 98 which is in vacuum tight engagement with "T" connection 94 and the vacuum pump 93. The vacuum pump finally expels the non-condensable gases directly into the atmosphere.

At this time second condenser 92 is vented to atmosphere since opening 52 in the inner member is now in registration with opening 38 in conduit 76, and opening 50 in the inner member is in registration with opening 34 in conduit 68, so that now a direct path for admitting atmospheric air to the second condenser exists. This atmospheric air is prevented from gaining access to the vacuum system by circumferentially raised portions 11 and 14, and by longitudinally raised portions 41 and 43. Similarly circumferential portions 53 and 55, together with longitudinal portions 47 and 49 protect the system from atmospheric air coming through opening 32 in conduit 64.

The vacuum valve of the invention may thus be used to connect first one condenser to the freeze drying system, and then at a pre-selected period of time a second condenser, and so on, on a continuous basis, and for prolonged periods of time.

Figure 6:
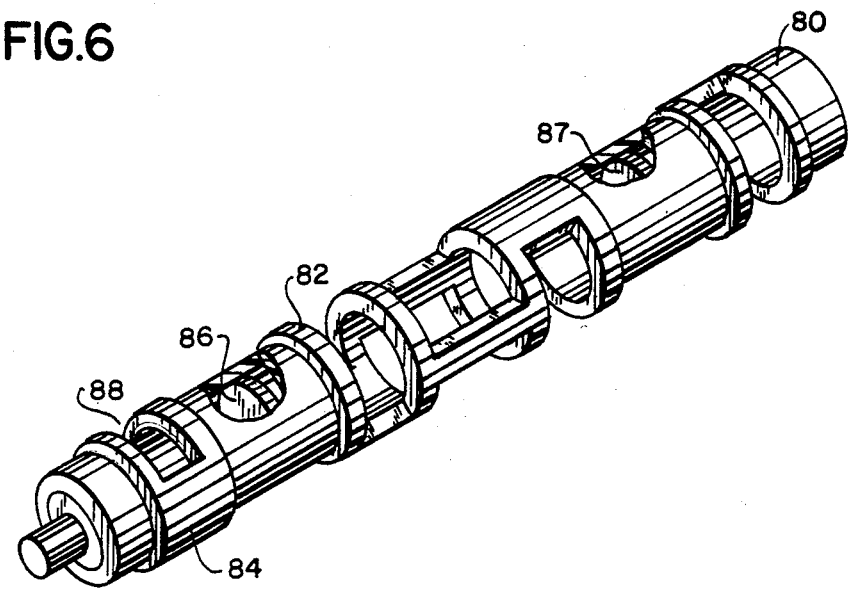
FIG. 6 is a partial cutaway perspective view of a second preferred embodiment of the tubular, rigid inner member of the invention, showing the circumferentially and longitudinally raised surfaces along the periphery of the inner member.

Referring now to FIG. 6 a second preferred embodiment of the tubular, rigid inner member of the valve of the invention is depicted. The slots in this second inner member correspond to the openings in the first inner member depicted in FIG. 1A. Reduction in frictional force as previously described for the first inner member is obtained here by reducing the diameter of the second inner member 80 along the greater portion of its length. The full diameter is permitted to contact only the inner surface of the outer member 10 (not shown) at spaced distances along the length of the second inner member. As before there is a left side fluid barrier 86 and a right side fluid barrier 87. Raised portion 82 operates primarily in a circumferential manner, while raised portions such as 84 operate in both a circumferential and longitudinal manner, so that when slots, such as slot 88 in the second inner member, are in registration with mating openings in the outer member, leakage of atmospheric air into the system is prevented as the valve performs its function of connecting first one condenser to the vacuum system, and then venting this condenser to atmospheric pressure while a second condenser is connected to the vacuum system, and so on as required for the performance of a continuous freeze drying procedure.

It should be noted that although the two previously described preferred embodiments of the invention depict a single inner member cooperating with a single outer member to perform a variety of vacuum connection and disconnection operations, the valve of the invention can be fabricated in shorter lengths and smaller internal diameters, and with fewer openings for vacuum connections, as, for example, an "on" "off" vacuum valve.

While the present invention has been disclosed in connection with the preferred embodiments shown and described in detail, various modifications and improvements thereon will become readily apparent to those skilled in the art. Accordingly, the spirit and scope of the present invention is to be limited only by the following claims.

I claim:

1. A low friction vacuum valve, comprising:
a first elastomeric, tubular outer member being open at both ends and having a pair of openings along its length communicating with a pair of additional elastomeric, tubular members at a spaced distance from each other, integral with and at an angle to said first member, and a rigid, tubular inner member being closed at both ends, slidably and rotatably mounted within said first member, having a pair of openings along its length for communicating with said pair of additional tubular members, said inner member having a pair of circumferentially raised portions for each of said openings in said inner member, said circumferentially raised portions being greater in outer diameter than the outer diameter of said inner member, each of said openings in said inner member being spaced in between one of said pairs of circumferential portions, a pair of longitudinally raised portions for each of said pairs of circumferential portions, said longitudinal portions being equal in outer diameter to the circumferential portions, each one of said pair of said longitudinal portions being spaced between and connected to each one of said pair of circumferential portions, so that the area defined by each of said pairs of longitudinal portions within each of said pairs of circumferential portions is larger than the open area of each of said openings in said inner member, and said area is also larger than the open area of said openings in said additional tubular members, the diameter of said circumferential portions and longitudinal portions being larger than the internal diameter of said first member, so that when an additional tubular member is connected to a source of vacuum said inner member cooperates to form a vacuum seal with said first member, and also reduces frictional force when turning said inner member within said first member.

2. A vacuum valve according to claim 1 wherein said elastomeric, tubular outer member is of a clear elastomer.

3. A vacuum valve according to claim 2 wherein said clear elastomer is a clear urethane.

4. A vacuum valve according to claim 1 wherein said elastomeric, tubular outer member has a durometer between 30 and 50.

5. A vacuum valve according to claim 1 wherein said rigid, tubular inner member is of polyvinyl chloride.

6. A vacuum valve according to claim 1 further comprising a motor for turning said inner member within said outer member.

7. A vacuum valve according to claim 1 further comprising a timer for turning said motor on and off in a timed sequence to provide for continuous operation.

8. A vacuum valve in accordance with claim 2 wherein a Tesla coil may be used to detect a vacuum leak.

9. A vacuum valve according to claim 1, for use in a continuous vacuum drying apparatus, further comprising a plurality of said openings in said inner member, together with a plurality of said pairs of circumferential and longitudinal portions, and a plurality of said openings in said additional tubular members in said first member, during a first period to time, a drying chamber, a first condenser, and a first source of vacuum being connected by said valve, while simultaneously a second condenser it at atmospheric pressure, means for rotating said valve during a second period of time, so that said drying chamber is connected to a second condenser, and a second source of vacuum, while simultaneously said first condenser is at atmospheric pressure, and means for rotating said valve during a third period of time so that said drying chamber is connected to said first condenser and said first source of vacuum, while simultaneously said second condenser is at atmospheric pressure, and so on, in a continuous vacuum drying procedure.

10. A vacuum valve according to claim 9 in which said drying apparatus is a continuous freeze drying apparatus.

11. A low friction vacuum valve, comprising:
a first elastomeric, tubular outer member being open at both ends and having a pair of openings along its length communicating with a pair of additional elastomeric, tubular members at a spaced distance from each other, integral with and at an angle to said first member, and a rigid, tubular inner members being closed at both ends, slidably and rotatably mounted within said first member, having a pair of openings along its length for communicating with said pair of additional tubular members, said inner member having a pair of circumferentially raised portions for each of said openings in said inner member, said circumferentially raised portions being greater in outer diameter than the outer diameter of said inner member, each of said openings in said inner member being spaced in between one of said pairs of circumferential portions, spaced in between and connected to each of said pairs of circumferential portions is a longitudinally raised portion of equal outer diameter to the circumferential portions, said longitudinal portions each having a surface area greater than the area of each of said openings in said inner member and greater in surface area than the area of each of said opening is said additional tubular members, the diameter of said circumferential portions and longitudinal portions being larger than the internal diameter of said first member, so that when an additional tubular member is connected to a source of vacuum said inner member cooperates to form a vacuum seal with said first member, and also reduces frictional force when turning said inner member within said first member.

* * * * *